United States Patent
Johnson et al.

[15] 3,640,194
[45] Feb. 8, 1972

[54] PHOTOGRAPHIC APPARATUS FOR MOUNTING A MULTILAMP FLASH UNIT

[72] Inventors: Bruce K. Johnson, Andover; Donald H. Hendry, Quincy, both of Mass.

[73] Assignee: Polaroid Corporation, Cambridge, Mass.

[22] Filed: June 29, 1970

[21] Appl. No.: 50,379

[52] U.S. Cl. ..........................95/11 L, 240/37.1, 339/147 P, 431/93
[51] Int. Cl. .....................................................G03b 17/48
[58] Field of Search ..........................95/11 R, 11 L, 11.5 R; 240/1.3, 37, 37.1; 431/93; 339/45 T, 147 P

[56] References Cited

UNITED STATES PATENTS

| | | | |
|---|---|---|---|
| 3,357,329 | 12/1967 | Nerwin | 95/11 L |
| 3,407,717 | 10/1968 | Ernisse | 95/11 |
| 3,511,148 | 5/1970 | Simon | 95/11 |
| 3,520,237 | 7/1970 | Engelsmann et al. | 95/11 |
| 3,544,248 | 12/1970 | Beach | 240/1.3 X |
| 3,545,354 | 12/1970 | McCune | 95/11 L |

*Primary Examiner*—Samuel S. Matthews
*Assistant Examiner*—Fred L. Braun
*Attorney*—Brown and Mikulka, William D. Roberson and Gerald L. Smith

[57] ABSTRACT

A mounting for a photographic flashcube. The mounting features two independently rotatable carriage members which are mechanically united upon engagement with the stem of a flashcube. A light spring within one of the carriage members provides for resetting the mounting upon removing a flashcube from engagement therewith.

13 Claims, 6 Drawing Figures

PATENTED FEB 8 1972

INVENTORS
DONALD H. HENDRY
BRUCE K. JOHNSON
BY Brown and Mikulka
and
Gerald L. Smith
ATTORNEYS

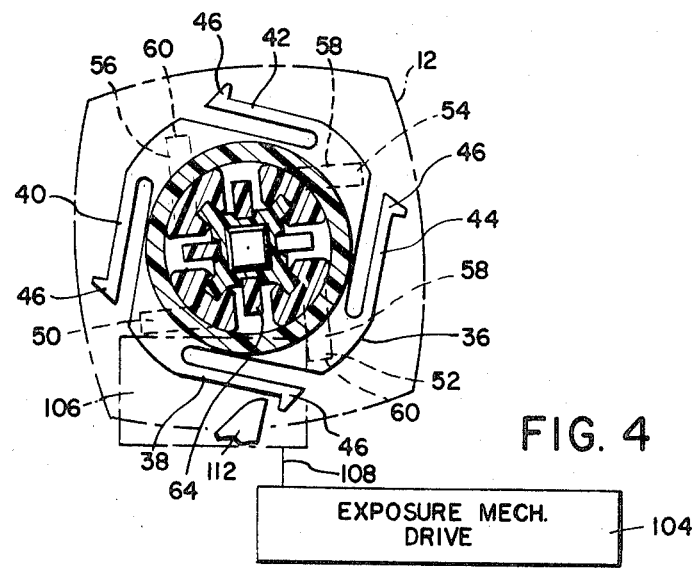
FIG. 4
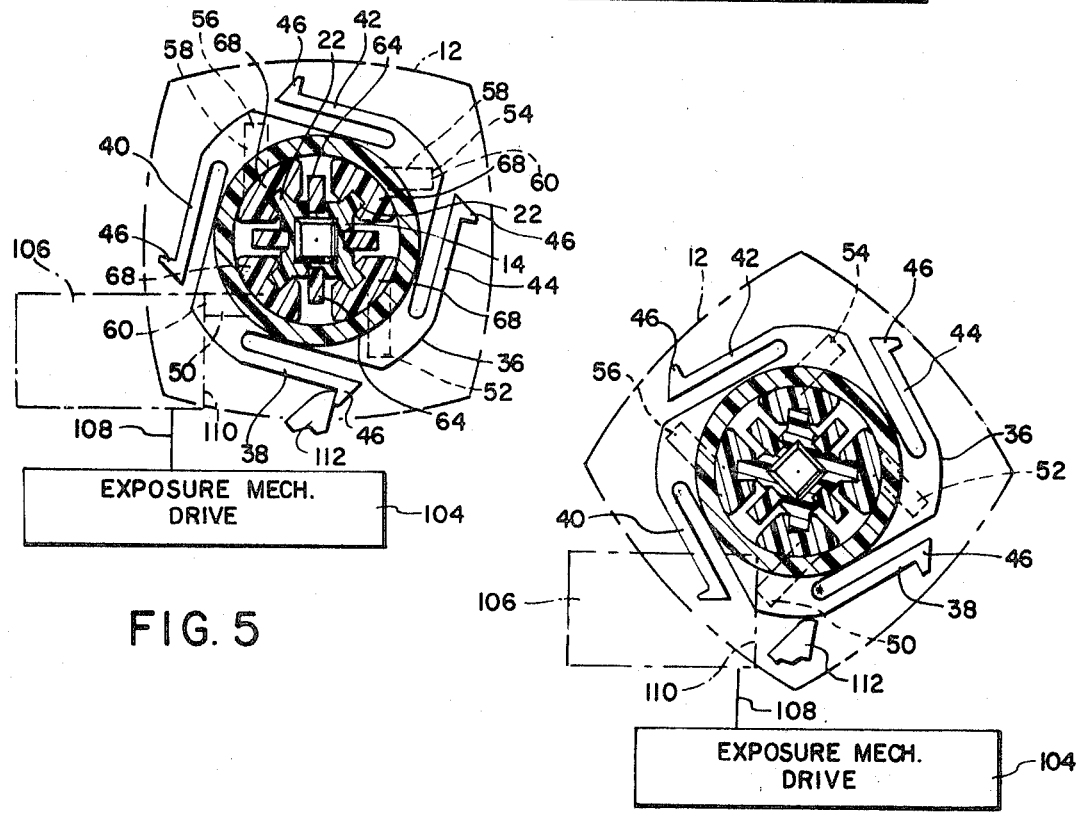
FIG. 5
FIG. 6
INVENTORS
DONALD H. HENDRY
BRUCE K. JOHNSON
BY Brown and Mikulka
and
Gerald L. Smith
ATTORNEYS

PHOTOGRAPHIC APPARATUS FOR MOUNTING A MULTILAMP FLASH UNIT

BACKGROUND

Packaged multilamp flash assemblies have been developed in which a plurality of flashlamps are arranged upon a base support structure which is manipulated to provide for their sequential ignition. Typical packaged units, popularly known as "flashcubes," assume a cubic form and are configured having a generally rectangular base member upon which are mounted four flashlamps. Each of the flashlamps is aligned before a cooperative reflector so as to function direct light through an appropriate face of the cubic package when ignited.

In one of the flashcube assemblies which have been developed, the four flashlamps mounted therein are designed to be mechanically ignited. The base member upon which each of the flashlamps is mounted is configured generally rectangularly, having a stem extending downwardly therefrom concentrically with the axis of rotation of the assembly. This stem is characterized in being hollow and having a noncircular or square internal cross section.

Mounting arrangements for receiving flashcubes generally are assembled in conjunction with the operating mechanism of a camera. These mountings are called upon to both align or index the flashcubes at operating positions wherein a selected one of the flashlamps and its cooperative reflector is properly oriented with respect to a scene and, additionally, to rotate the flashcubes between exposures to provide for a sequential ignition of the flashlamps.

Rotation of the flashcubes generally requires a source of mechanical energy which usually is derived from the mechanical motion available from film-winding mechanisms. The film-winding mechanisms are employed to wind or load springs which are subsequently tripped to run down and provide necessary rotation between successive operative positions. Because of the considerable amount of mechanical energy available from such mechanisms as film-winding systems, the additional forces required by the flashcube rotating mechanisms may be ignored.

Should a film-winding or advancing mechanism not be available with a camera, a supplementary source of mechanical energy is supplied. For instance, clock springs or the like which are operated in combination with escapement mechanisms may be provided to cause incremental rotation of the flashcubes. While the force required to trigger such mechanisms is relatively mild, the clock springs must be manually wound through the flashcube as a preliminary step in preparing a camera to make a series of exposures. Usually, designs for such indexing mechanisms require an undesirable number of component parts. Further, for purposes of convenience on the part of the camera operator, it is desirable to eliminate any additional preparatory steps to the making of a photographic exposure. Another factor considered in the design of such indexing systems resides in the consideration of the escapement mechanisms or the like which serve to control the rotation of flashcube rotating systems are subject to wear and, consequently, pose undesirable produce design problems.

A flashcube mounting arrangement should be assembled with very few and relatively simply formed component parts and should be suitably friction-free to permit operation under relatively weak spring drives. In a particularly desirable design approach, such spring drive forces are derived from the mechanical motions associated with the operation of a photographic shutter mechanism.

SUMMARY OF THE INVENTION

The present invention is addressed to an apparatus for supporting a packaged multilamp flash assembly and sequentially advancing the lamps therein from one operative position to another. Rotation is achieved utilizing relatively low torsional forces, thereby permitting operation of the apparatus in conjunction with the delicate exposure mechanism of a photographic camera. For instance, flashcube rotation by the apparatus can be achieved with the spring forces utilized to return a manually actuated shutter mechanism to a preexposure orientation.

Through an arrangement wherein a flashcube is supported for rotation by two carriage members which are mechanically united through the flashcube itself, significant reduction in the spring forces required to provide proper indexing of the flashcube are realized. Because of the low frictional forces developed by the dual carriage assembly of the invention, only torsionally loaded springs of relatively low loading requirements are needed to assure both proper indexing of a flashcube as well as to provide a reset function following the expenditure of all flashlamps within a flashcube assembly.

The entire mechanical assembly of the inventive apparatus includes only two moving components which operate in conjunction with a light torsional spring. These components are fabricable using high-volume low-cost production techniques, thereby permitting the use of the apparatus with a broad spectrum of camera styles including those of a popularly priced variety.

Another feature and object of the invention is to provide a mounting apparatus for supporting a flashcube assembly of a variety having a base member including a downwardly extending hollow stem formed with a noncircular or square internal cross section. The noncircular hollow portion of this stem is used to engage one of the rotatable carriages of the assembly, while the outer surface of the stem is configured to be engaged by the other of the coaxially mounted carriages. As a result of the stem being secured to each of the carriages, a mechanical union thereof is realized without the use of extraneous spring mechanisms or keyway techniques. Through the use of a torsional spring loadable under relatively mild forces, one of these carriages can be biased for rotation into a preexposure or reset position. Such rotation is permitted upon removal of the flashcube and dissolution of the mechanical union between the two carriages.

As another aspect and object of the invention, a tab and stop arrangement is incorporated with the spring-driven carriage. This tab may be dimensioned so as to permit a flashcube to move into an inoperative orientation following the expenditure of a last flashlamp contained therewithin.

Another object and feature of the invention is to provide a flashcube mounting arrangement of the type described which is rotatable to advance individual flashlamps of a flashcube into operative positions in response to the actuation of a shutter mechanism and to restrict further operation of the shutter mechanism following the expenditure of all flashlamps within the flashcube package.

Other objects of the invention will in part be obvious and will in part appear hereinafter. The invention accordingly, comprises the apparatus possessing features, techniques and properties which are exemplified in the description to follow hereinafter.

For a fuller understanding of the nature and objects of the invention, reference should be made to the following detailed description taken in connection with the accompanying drawings.

BRIEF DESCRIPTION OF THE DRAWINGS

FIG. 4 is a top view of the apparatus of FIG. 2 with portions broken away and in phantom to reveal internal structure;

FIG. 5 illustrates the components of FIG. 4 as they are oriented during a select portion of an exposure cycle; and FIG. 6 shows the components of FIG. 4 during a later stage of an exposure cycle.

DETAILED DESCRIPTION

Figure 1:
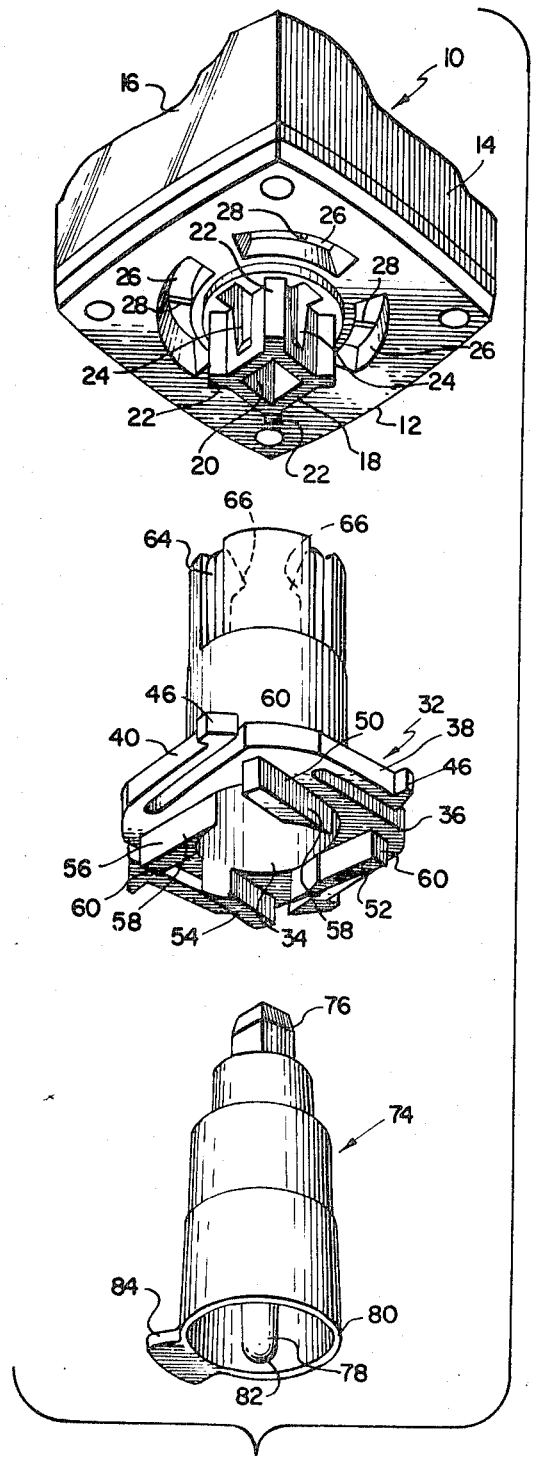
FIG. 1 is an exploded pictorial representation of the apparatus of the invention including the base or bottom portion of a flashcube, portions of the components shown being broken away to reveal internal features.

Referring to FIG. 1, a flashcube having a base structure suited for engagement with apparatus of the present invention is illustrated generally at 10. Having a generally rectangular configuration, the base 12 of the flashcube supports four flashlamps (not shown) along with corresponding reflectors in positions for providing illumination through orthogonally disposed transparent face portions as at 14 and 16. Depending centrally from the underside of the base 12 is a hollow stem 18. The periphery of cavity 20 within stem 18 defines a noncircular cross section, typically being rectangular or square. Extending outwardly from the base 12 and along the external edges of the rectangular stem 18 are lugs as shown at 22. Between each of the lugs 22, the external surfaces of stem 18 are formed having indentations or depressions as shown at 24. Base 12 is also configured having arcuate slot 26 selectively positioned about the surfaces of stem 18. Positioned within the flashcube 10 and behind each of the slots 26, are firing pins as at 28, the function of which is percussively to ignite a corresponding flashlamp within the assembly. As may be apparent, the slots 26 provide access to the firing pins 28 for a firing mechanism such as a probe or the like which is extensible therethrough when the flashcube 10 is in a proper operative position for illuminating a photographic subject.

The apparatus of the present invention provides for the support of flashcubes as at 10 from a dual carriage assembly, outer carriage member of which is shown generally at 32. Carriage 32 is generally formed as a right circular cylinder having a hollow cylindrical interior 34. The lower end of carriage 32 is configured to form an outwardly extending flange portion 36. Flange portion 36 is structured having integrally formed latching elements, two of which are shown at 38 and 40. Each of the latches as at 40-44 is configured having a detent portion 46 and is resiliently movable toward and away from the periphery of flange 36.

Extending beneath flange portion 36 are four engaging tabs 50-56. Molded integrally with the flange portion 36, each of the tabs 50-56 is formed having an outwardly facing planar cam surface as at 58 and a contact tip 60 disposed orthogonally thereto.

Formed in the upward side of carriage 32 are four resilient gripping members 64, the upward tip portion of each of which is configured to form a detent like structure 66. Gripping members 64 are arranged in quandrantal manner about carriage 32 such that the tip structure 66 of each will engage a given one of the indentations 24 formed in the outward surface of stem 18 of flashcube 10. Intermediate each succeeding pair of gripping members 64, the cylindrical carriage 32 is formed to provide keyways 68. (FIGS. 4-6). Keyways 68 are arranged to slideably receive the lugs 22 extending from the corners of stem 18.

Figure 2:
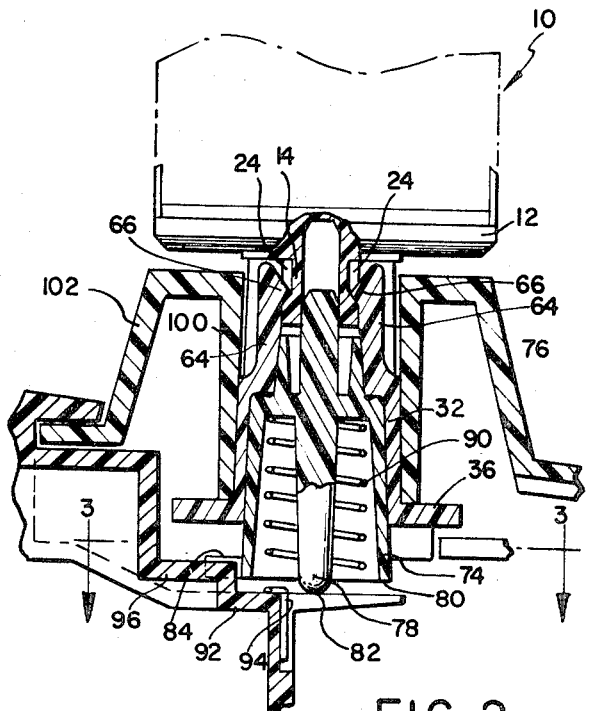
FIG. 2 is a sectional view of the apparatus of the invention showing the assembled configuration of the components of FIG. 1.

The second or inner carriage of the assembly is shown generally at 74. Referring additionally to FIG. 2, internal carriage 74 is formed having a generally hollow configuration, the internal portion of which supports two centrally disposed posts 76 and 78. The upper post at 76 is configured having a noncircular or rectangular cross section suited to slideably fit and engage within the hollow interior 20 of stem 18. When so inserted, rotational movement can be imparted to the flashcube 10 from the inner carriage 74. Post 78 extends downwardly from the central portion of carriage 74 a distance slightly beyond the bottom edge 80 of the component. The lowermost portion of post 78 is rounded to form a bearing point 82. Extending outwardly from edge 80 is a travel-limiting tab 84. As shown in FIG. 2, a helical spring 90 is positioned within the lower portion of carriage 74. The upper tip of spring 90 is fixed to carriage 74 and the opposite lower end of the spring 90 is connected to a supporting base for the assembly 92 at 94.

All of the movable component parts of the flashcube mounting apparatus have now been described. It may be noted that only three elements are involved, i.e., carriages 32 and 74 and helical spring 90.

Referring to FIG. 2, carriage 74 is shown to be dimensioned so as to be slideably positioned within the hollow cylindrical interior 34 of carriage 32, carriage 32 being vertically supported by carriage 74. The assembly of carriages 32 and 74 is supported laterally within a camera mechanism formed incorporating a cylindrical shaft, the sidewalls of which are shown at 100. Sidewalls 100 are formed integrally within a supporting platform, the outer structure of which is shown at 102. Beneath platform 102, supporting base 92 is seen to have a steplike configuration including a stop 96. The lowermost portion of base 92 provides a vertically supporting point engagement for the bearing point 82 of post 78.

Flashcube 10 is inserted within the assembly by sliding hollow cavity 20 of stem 18 over the upwardly extending post 76 of inner carriage 74. As the flashcube 10 is thus inserted, gripping members 64 will cam over the outer surfaces of stem 18 and detent tips 66 will be resiliently urged into engagement with indentations 24 of the stem. When so inserted within the apparatus, flashcube 10 provides a mechanical union between the inner carriage 74 and outer carriage 32. As a consequence, carriage 32 will rotate in correspondence with carriage 74 within the cylindrical shaft defined by sidewalls 100. When the assembly is caused to rotate, spring 90, preferably selected having a relatively low torsional loading characteristic, will be wound.

As indicated earlier, the flashlamp advancing mechanism advantageously can be operated by a convenient reciprocatory motion derived from the operation of an exposure mechanism derived from a photographic shutter. A reciprocatory motion is required in providing the relatively low force drive. Such an exposure mechanism is described and claimed in a copending application for United States patent by Bruce K. Johnson entitled "Exposure Control Mechanism With Mechanical Flash Synchronization," filed of even date herewith, Ser. No. 50,583 and assigned in common herewith. Such an exposure mechanism is illustrated functionally by block 104 in the drawings. Mechanism 104 includes a reciprocating element such as a camming flange at 106 the connection of which to mechanism 104 is shown by a line 108.

Referring to FIG. 4, near the end of any exposure cycle, the forward edge 110 of flange 106 will abut against a contact tip 60 of an engaging tab as at 52 urging outer carriage 32 to move in a counterclockwise direction against the bias exerted on the assembly by helical spring 90. A slight override of the assembly beyond a proper operational position is thereby provided as shown in FIG. 4. During counterclockwise movement, the detent portion 46 of latching elements as at 38 will move over a stop member 112 formed within the base structure 92. When a shutter release button within exposure mechanism drive 104 is released the override of the mechanism will end, permitting the flange 106 to return latching element 38 to engage with stop member 112. When so engaged, flashcube 10 will be indexed and properly oriented for illuminating a photographic scene. This orientation is represented in FIG. 5. The above-described override feature serves to accrue proper connection of detent portion 46 with stop member 112.

During a next succeeding exposure cycle, camming flange 106 will be moved to the position shown in FIG. 5 in which its forward edge 110 will engage the contact tip 60 of engaging tab 50. In moving to the position shown, the rearward edge of camming flange 106 will slide over the cam surface 58 of engaging tab 50. After being moved to the position shown in FIG. 5, camming flange 106 is caused to return to the orientation shown in FIG. 4. Intermediate these two positions, the cam will assume such orientations as shown in FIG. 6. As the flashcube mounting is driven to its next operative position, the next of the latching elements as at 40 will move into indexing engagement with stop 112 to provide proper operational orientation of the flashcube assembly.

Figure 3:
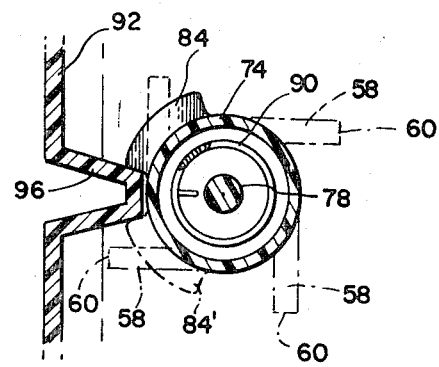
FIG. 3 is a sectional view of the apparatus of the invention taken through the line 3—3 in FIG. 2.

Referring to FIG. 3, as the united assembly of carriages 32 and 74 is caused to rotate during a succession of exposure cycles, tab 84 of inner carriage 74 will rotate in a counterclockwise direction from its abutment against a stop 96 formed in base 92. When a final flashlamp is in position, tab 84 will have moved from its position indicated in phantom at 84 to the position indicated at 84. As a consequence of its abutment against stop 96, the assembly cannot be rotated further. As further consequence, camming flange 106 cannot be moved and the exposure mechanism drive 104 will be restrained from operation.

Looking additionally to FIG. 2, when flashcube 10 is removed from engagement with both carriages 32 and 74, carriage 74 is permitted to independently rotate within carriage 32 under the bias of spring 90, the latter having been loaded during the advancement of flashcube 10 between operative positions. Released for rotation, carriage 74 will turn in a clockwise direction until its tab 84 assumes position shown at 84 abutting against stop 96. Carriage 32 will not rotate with carriage 74 when the latter returns to its preexposure terminal position, inasmuch as that latching element 38–44 whose detent portion 46 is engaged with stop member 112 will remain so engaged. In effect, carriage 32 may be considered to be rotatable in a counterclockwise direction only. Upon the insertion of a fresh or unexpended flashcube 10 the carriages will be mechanically reunited and another sequence of exposures may be made. By selectively dimensioning the length of tab 84 as measured along its direction of rotation, the mounting apparatus may function to position a flashcube in an obviously inoperative orientation following the ignition of a final flashlamp. For example, the flashcube rotation may be arrested at a position about 45° out of proper alignment. Such an obviously inoperative position will appraise an operator of the need to insert a fresh flashcube.

From the foregoing it may be noted that spring 90 is only called upon to provide an assured indexing contact between stop 112 and detent portion 46 of latching elements 38–44. Additionally, the spring provides for the independent counterrotation of inner carriage 74 following the removal of a flashcube from the apparatus. Consequently, the spring 90 need only exert mild torsional force and the entire assembly may be rotated under the low drive forces available from a shutter mechanism.

In the above discussion, the terms "clockwise" and "counterclockwise" were used in a descriptive sense for the purpose of facilitating and understanding of the operation of the mechanism as viewed within the referenced drawings. These terms are not used in limitation of the disclosure.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for supporting a packaged multilamp flash assembly and sequentially advancing the lamps therein from one position to another comprising:
   first carriage means removably engageable with said flash assembly and rotatable coaxially therewith in a given direction to cause said lamp advancement;
   second carriage means removably engageable with said flash assembly and mounted coaxially with said first carriage means for rotation between terminal positions limiting the extent of rotation of said flash assembly, said second carriage means being corotational with said first carriage means in said given direction when said first and second carriage means are coupled through mutual engagement with said flash assembly;
   means rotating said first carriage means in said given direction for causing said lamp advancement; and
   spring means engaging said second carriage means for imparting a rotational bias thereto in a direction opposite said given direction for causing said second carriage means to assume a select one of said terminal positions when said flash assembly is removed from engagement therewith.

2. The photographic apparatus of claim 1 in which said first carriage means includes indexing means for successively positioning said first and second carriage means to orient succeeding lamps within said flash assembly into an operative position.

3. The photographic apparatus of claim 1 in which said second carriage means is mounted for mutually independent coaxial rotation internally of said first carriage means.

4. The photographic apparatus of claim 3 in which said first carriage means is mounted for rotation upon said second carriage means.

5. The photographic apparatus of claim 1 in which said second carriage means is vertically supported for rotation about a point contact bearing.

6. The photographic apparatus of claim 1 in which said second carriage means includes stop means for limiting said rotation to movement between said terminal positions.

7. The photographic apparatus of claim 6 wherein said stop means is configured and arranged to cause said first and second carriage means to orient said packaged multilamp assembly in an inoperative position following the ignition of a final lamp therewithin.

8. Photographic apparatus for mounting a packaged flash assembly incorporating a base member supporting a plurality of flashlamps and including a downwardly depending hollow stem, the interior of which is formed having a noncircular shape, comprising:
   a photographic housing;
   first carriage means engageable with the exterior of said stem for removable retaining said flash assembly upon said housing and rotatable coaxially with said assembly in a given direction to cause said flashlamps to move from one position to another;
   second carriage means removably engageable within the said hollow interior of said stem and mounted upon said housing coaxially with said first carriage means, said second carriage means being corotational with said first carriage means in said given direction when said first and second carriage means are coupled through mutual engagement with said flash assembly stem;
   means for rotating said first carriage means in said given direction for causing said flashlamps to successively advance into an operative position; and
   spring means engaging said second carriage means for imparting a rotational bias thereto in a direction opposite said given direction for causing said second carriage means to assume a select one of said terminal positions when said flash assembly is removed from engagement therewith.

9. The photographic apparatus of claim 8 in which said first carriage means is rotatably mounted upon and vertically supported by said second carriage means.

10. The photographic apparatus of claim 9 in which said second carriage means is mounted for rotation mutually independently of said first carriage means.

11. The photographic apparatus of claim 10 in which said second carriage means is configured and arranged for vertical support from a point contact with said housing.

12. The photographic apparatus of claim 11 including detent means for restriction of the said rotation of said first carriage means to said given direction and for causing said first and second carriage means to rotate between selected positions for orienting successive said flashlamps in said operative position.

13. The photographic apparatus of claim 12 in which said housing is configured to include stop means engageable with a portion of said second carriage means to establish said terminal positions.